Patented Feb. 22, 1949

2,462,357

UNITED STATES PATENT OFFICE 2,462,357

PREPARATION OF β-LACTONES

John R. Caldwell and Hugh J. Hagemeyer, Jr., Kingsport, Tenn., assignors to Eastman Kodak Company, Rochester, N. Y., a corporation of New Jersey No Drawing. Application February 4, 1948, Serial No. 6,347

16 Claims. (Cl. 260—344)

This invention relates to a process for preparing lactones of β-hydroxy carboxylic acids by reacting a ketene with a carbonyl-containing compound, such as an aldehyde, ketone, diketone or ketoester.

Staudinger first showed that a keto ketene, such as diphenyl ketene, added to aldehydes or ketones to give β-lactones. Ann. 384, 38-135 (1911) and Ann. 380, 243 (1911). Staudinger also showed the addition of diphenyl ketene to unsaturated ketones, and isolated diolefins from the reaction mixture. Ann. 401, 263 (1913).

Aldo ketenes, on the other hand, are relatively unstable as compared with keto ketenes and dimerize rapidly, under ordinary conditions of temperature and pressure. In the absence of a catalyst, aldo ketenes do not condense with carbonyl compounds, but form the dimer instead. With aldehydes, the ketene dimers react to form unsaturated ketones. See Boese, United States Patent 2,108,427, dated February 15, 1938.

Kung in United States Patent 2,356,459, dated August 22, 1944, has shown that ketene ($CH_2=C=O$) reacts with aldehydes or ketones to give β-lactones, in the presence of Friedel-Crafts types of catalysts.

We have now found that β-lactones can conveniently be prepared by reacting a ketene with an aldehyde, ketone, diketone, or ketoester, hereinafter referred to as carbonyl-containing compounds, in the presence of an alumina-containing catalyst.

It is accordingly an object of our invention to provide a process for preparing β-lactones.

A further object of our invention is to provide a process for preparing β-lactones whereby yields of 75 to 85% can be obtained.

Still a further object of our invention is to provide new catalysts for the reaction between a ketene and a carbonyl-containing compound. Other objects will become apparent hereinafter.

In accordance with our invention, we prepare β-lactones by reacting a ketene with a carbonyl-containing compound, such as an aldehyde, ketone, diketone, or ketoester in the presence of a catalyst comprising an oxide of aluminum.

The ketenes which are advantageously employed in practicing our invention can be represented by the following general formula:

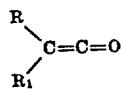

wherein R and $R_1$ each represents a hydrogen atom, an alkyl group (e. g. especially methyl and ethyl groups, i. e. alkyl groups of the formula $C_nH_{2n+1}$ wherein $n$ represents a positive integer of from 1 to 2), or an aryl group (especially a phenyl group, i. e. a $C_6H_5$–group). Although our invention is directed primarily to a process involving ketene ($CH_2=C=O$), any aldo ketone or any keto ketone can be employed. Typical aldo ketenes include ketene, methyl ketene, ethyl ketene, etc. Typical keto ketones include dimethyl ketene, diethyl ketene, diphenyl ketene, methyl phenyl ketene, etc.

The aldehydes which are advantageously employed in practicing our invention can be presented by the following general formula:

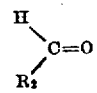

wherein $R_2$ represents hydrogen, an alkyl group (especially methyl, ethyl, isopropyl, n-propyl, n-butyl, isobutyl, secondary butyl and tertiary butyl groups, i. e. an alkyl group of the formula $C_nH_{2n+1}$ wherein $n$ represents a positive integer of from 1 to 4), an aralkyl group (especially benzyl or β-phenylethyl), and an aryl group (especially a monocyclic aryl group of the benzene series, e. g. phenyl, m-tolyl and p-tolyl). Our new process is especially useful for the preparation of β-lactones from aldehydes of the above general formula wherein $R_2$ represents a hydrogen atom or a methyl group.

The ketones which are advantageously employed in practicing our invention can be represented by the following general formula:

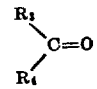

wherein $R_3$ represents an alkyl group (especially methyl, ethyl, isopropyl, n-propyl, n-butyl, isobutyl, secondary butyl and tertiary butyl groups, e. g. an alkyl group of the formula $C_nH_{2n+1}$ wherein $n$ represents a positive integer of from 1 to 4), an aryl group (especially a monocyclic aryl group of the benzene series, e. g. phenyl, m-tolyl and p-tolyl) or an aralkyl group (especially benzyl and β-phenylethyl), and $R_4$ represents an alkyl group (especially methyl and ethyl groups) an aryl group (especially a monocyclic aryl group of the benzene series, e. g. phenyl, m-tolyl and p-tolyl) or an aralkyl group (especially benzyl and β-phenyl-ethyl). Our new process is especially useful for the preparatoin of β-lactones from the above-formulated ketones wherein R₄ represents a methyl group.

The diketones which are advantageously employed in practicing our invention can be represented by the following general formula:

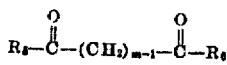

wherein R₅ and R₆ each represents an alkyl group (especially a methyl, an ethyl or a n-propyl group) and m represents a positive integer of from 1 to 3.

The keto carboxylic esters which are advantageously employed in practicing our invention can be represented by the following general formula:

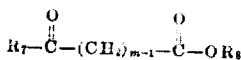

wherein R₇ represents an alkyl group (especially methyl and ethyl groups), R₈ represents an alkyl group (especially methyl, ethyl, isopropyl, n-propyl, n-butyl, isobutyl and secondary butyl groups) and m represents a positive integer of from 1 to 3.

Typical of the aldehydes, ketones, diketones and keto carboxylic esters are: formaldehyde, acetaldehyde, propionaldehyde, n-butyraldehyde, isobutyraldehyde, phenylacetaldehyde, benzaldehyde, p-methylbenzaldehyde, crotonaldehyde, furfuraldehyde, acetone, ethyl methyl ketone, methyl n-propyl ketone, methyl isopropyl ketone, methyl n-butyl ketone, methyl isobutyl ketone, diethyl ketone, methyl isopropenyl ketone, acetophenone, methyl benzyl ketone, p-methylacetophenone, diacetyl, dipropionyl, di-n-butyryl, diisobutyryl, acetyl acetone, hexanedione-2,4, methyl pyruvate, ethyl pyruvate, methyl acetoacetate, ethyl acetoacetate, n-propyl acetoacetate, n-butyl acetoacetate, ethyl levulinate, etc.

Among the catalysts utilized in our invention are "activated alumina" and those comprised essentially of complexes formed by the interaction or association of aluminum oxide with silicon oxide. These catalysts are well known and are described in the literature. Other types of catalysts can be prepared by modification of the alumina or alumina (aluminum oxide)-silica (silicon oxide) catalysts with oxides of other metals or metal-like elements such as zirconium, thorium, and boron. An important feature of the use of the instant catalysts is that they do not dissolve in the reaction medium, as do the catalysts of the prior art, i. e., the present catalysts are heterogeneous in character. The advantages of the present catalysts over those formally employed are exceedingly important from a commercial standpoint. They greatly simplify the operation of a continuous process, since the catalyst and reaction medium never become homogeneous and the reaction products can be readily separated from the reaction containing the catalyst. A further advantage is that the catalysts of the present invention remain stable for longer periods of time and no expensive recovery is involved, as is encountered with the prior art catalysts. When the Friedel-Crafts catalysts of the prior art are employed, the β-lactones can not be obtained directly from the reaction chamber, it first being necessary to neutralize the catalyst, filter, and then finally distill. These expensive operations are avoided in the present process.

The catalysts which we employ can be conveniently prepared in any known manner. For example, the oxide of silicon can be precipitated as a hydrogel and the other oxides later incorporated therein, or a mixture of the oxides in suspension can be precipitated concurrently. Generally, we prefer to first precipitate a hydrated silicon gel, and later incorporate other oxides into the precipitate. This can conveniently be done by taking a commercial solution of water glass, which contains approximately 8 to 10% of sodium oxide (Na₂O) and 28 to 29% silicon oxide (SiO₂), and diluting to the order of 6 to 10 times. Acid, such as hydrochloric acid, is added slowly until the neutral point has almost been reached, and then stopped to allow the silica gel to completely form, before a slight excess of acid is added, and the excess neutralized.

Since alkali metal impurities, which are occluded when the silica is precipitated, must be removed in order to prevent subsequent sintering or fusion of the catalyst, the precipitate is then dried to reduce the volume thereof, thus rendering the same in a more suitable condition for washing to remove these alkali impurities. The dried precipitate is next washed with water to remove as much alkali impurity as possible, and the washing is continued with alternate washings of acid and salt solutions such as hydrochloric acid and ammonium chloride. The precipitation step and the washing step are of great importance in the preparation of the catalyst, since the exact conditions used have a profound effect on the activity and efficacy of the catalyst as finally produced.

The purified silica gel is next suspended in an aluminum salt solution, in the desired proportion, and a calculated amount of hydrated alumina can then be deposited thereon by addition of alkali-metal free precipitants, such as ammonium hydroxide. The precipitant is then filtered and centrifuged, and washed with water according to a preferred method of operation. The precipitant is then dried, and broken down into discreet particles of the desired size and dimensions. The particles are then calcined at temperatures of approximately 950°–1400° C. for several hours.

Alternatively, instead of precipitating the silica gel in the presence of hydrated alumina, the purified hydrated silica can be composited with hydrated alumina, or hydrated alumina in addition to one or more of the hydrated oxides of zirconium, thorium, or boron. The modified catalysts thus obtained are likewise suitable for our process.

When a catalyst other than "activated" alumina alone is used in our process, the proportion of oxides can be varied according to the type of carbonyl compound being reacted, however, we generally have found it advantageous when using an alumina-silica catalyst to use a catalyst containing about 5 to 30% by weight of alumina and 70 to 95% by weight of silica. These proportions vary when from 1 to 10% by weight of at least one of the oxides selected from the group consisting of zirconium, thorium, and boron is used. Thus an alumina-silica-zirconia catalyst may consist of 5% alumina (aluminum oxide), 10% zirconia (zirconium oxide), and 85% silica (silicon oxide). For the general purpose of our invention, we can advantageously use a catalyst selected from the group consisting of alumina (aluminum oxide), an alumina (aluminum oxide)-silica (silicon oxide) catalyst consisting of from 5 to 30% by weight of alumina and 70 to 95% by weight of silica, an alumina (aluminum oxide)-silica (silicon oxide)-zirconia (zirconium oxide) catalyst consisting of from 4 to 30% by weight of alumina, 55 to 95% by weight of silica, and 1 to 10% by weight of zirconia, an alumina (aluminum oxide)-silica (silicon oxide)-thoria (thorium oxide) catalyst consisting of from 4 to 30% by weight of alumina, 55 to 95% by weight of silica, and 1 to 10% by weight of thoria, and an alumina (aluminum oxide)-silica (silicon oxide)-boron oxide catalyst consisting of from 4 to 30% by weight of alumina, 55 to 95% by weight of silica, and 1 to 10% by weight of boron oxide, and mixtures thereof.

The amount of catalyst can likewise be varied according to the type of carbonyl-containing compound being used. Generally it is advantageous to use from 0.5 to 2.0% of catalyst based on the weight of the carbonyl compound used.

The form of the catalyst can likewise be varied as desired, and can be in the form of porous flakes or granules. Generally we prefer to use a fine powder of 150–300 mesh.

Other catalysts which can be used in our process are described by Thomas, "Journal of the American Chemical Society," vol. 66 (1944), pages 1586 to 1589, Thomas et al., "Journal of the American Chemical Society," vol. 66 (1944), pages 1694 to 1696, and Egloff et al., "Journal of the American Chemical Society," vol. 61 (1939), pages 3571 to 3580. The following patents also describe catalysts which can be used: Thomas et al. 2,229,353, dated January 21, 1941; Thomas et al. 2,242,553, dated May 20, 1941; Thomas et al. 2,270,090, dated January 13, 1942; Ahlberg et al. 2,282,922, May 12, 1942; Thomas et al. 2,285,314, dated June 2, 1942; Thomas et al. 2,287,917, dated June 30, 1942; Thomas et al. 2,329,307, dated September 14, 1943; and Thomas et al. 2,347,648, dated May 2, 1944.

The temperatures at which the present catalysts are used in the processes of the prior art vary from approximately 300° C. to 600°, i. e., the temperatures at which these catalysts are regarded to be active is relatively high. According to the present process in which we use an alumina-containing catalyst, the temperature can be as low as −20° C. or as high as 60° C. This was a most surprising discovery, since the temperatures at which the instant catalysts have been heretofore used differed to such a great extent over the present temperatures. This difference is of great practical importance since no expensive heating apparatus or arrangement are necessary and the process can be conveniently conducted at room temperature.

Where the carbonyl compound employed in an aldehyde, it is advantageous ordinarily to add the ketene and the aldehyde simultaneously and in equimolecular proportions to the catalyst or to a medium containing the catalyst. Where the carbonyl compound employed is a ketone, diketone or a keto carboxylic ester, the ketene is ordinarily advantageously added to the ketone or keto carboxylic ester containing the catalyst.

Advantageously our new process is carried out in a solvent for the reactants, i. e., an organic liquid which dissolves both the ketene and the aldehyde, ketone, diketone or keto carboxylic ester, and which is relatively inert to the reactants. Suitable solvents include the dialkyl ethers which are liquid at 10° C., e. g. diethyl ether, ethyl isopropyl ether, diisopropyl ether, ethyl n-butyl ether, methyl n-propyl ether, etc., cyclic ethers which are liquid at 10° C., e. g. 1,4-dioxane, chlorinated hydrocarbons which are liquid at 10° C., e. g. chloroform, carbon tetrachloride, ethylidene dichloride, ethylene dichloride, etc., hydrocarbons which are liquid at 10° C., e. g. benzene, toluene, etc.

In the case of the lower aldehydes, such as formaldehyde and acetaldehyde, ketones which are liquid at 10° C. can be employed as solvents because formaldehyde and acetaldehyde react with the ketenes much faster than do the ketones to give β-lactones in accordance with my process. Acetone and methyl ethyl ketone are advantageously employed as solvents when formaldehyde or acetaldehyde is employed. The β-lactones, themselves, are excellent solvents in which to carry out our new process.

The process of our invention can be carried out batchwise or continuously (e. g. in the continuous manner described in the copending application of Hugh J. Hagemeyer, Jr., and Delmer C. Cooper, Serial No. 660,286, filed April 6, 1946, where ketene (CH=C=O) is prepared by the catalytic pyrolysis of acetic acid at reduced pressures, it is advantageous to carry out our process at reduced pressures in a scrubber-type reactor, e. g. ketene and formaldehyde can be reacted at reduced pressure in a scrubber-type reactor (in the manner described in the copending application of Herbert G. Stone, Serial No. 660,285, filed April 6, 1946), using β-propionolactone as a solvent and boric acid as a catalyst.

Many of the β-lactones can be distilled from the reaction mixtures under reduced pressures. However, a number of the β-lactones derived from aldehydes and ketones containing olefinic or acetylenic bonds (e. g crotonaldehyde, methyl isopropenyl ketone, furfuraldehyde, etc.) and many of the β-lactones derived from keto carboxylic esters and diketones cannot be distilled, even under reduced pressure, without undergoing decarboxylation, i. e. loss of carbon dioxide, to give unsaturated compounds. Even the lower molecular weight β-lactones derived from lower molecular weight aldehydes and ketones, e. g. formaldehyde, acetaldehyde, acetone and ethyl methyl ketone, have a tendency to polymerize when heated. With these lower molecular weight β-lactones, it is advantageous to flash distill (i. e. distill rapidly under a low vacuum, the pump producing the vacuum having a capacity greater than the volume of vapor in the still) the reaction mixture and then to purify further the β-lactone by fractional redistillation under reduced pressure.

The following examples will further serve to illustrate the manner of practicing our invention.

*Example I.—Lactone of β-hydroxypropionic acid (β-propionolactone)*

Gaseous ketene can be produced by the pyrolysis of acetone with an electrically heated nichrome coil, and gaseous formaldehyde can conveniently be prepared by heating paraformaldehyde to a temperature of 140°–160° C. The gaseous ketene and gaseous formaldehyde were then mixed in substantially equimolar quantities and led into a stirred suspension of 1 g. of alumina-silica catalyst, obtained as described above, in 50 cc. of ethyl ether. During the passage of the gaseous mixture into the stirred suspension, the temperature was maintained at 10°–20° C. Gaseous ketene and formaldehyde were passed into the suspension until a total of 1.0 gm. mol of each reactant had been added. The reaction mixture was then filtered to remove the catalyst, and the filtrate distilled under vacuum. β-proprionolactone, distilling at 37°–40° C. under 4 mm. pressure, was obtained in 70–80% yield based on the ketene consumed.

*Example II.—Lactone of β-methyl-β-hydroxybutyric acid (β-butyrolactone)*

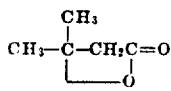

One gram of alumina-silica-zirconia catalyst, prepared as described in Thomas et al. Patent 2,347,648 or by Thomas in "J. A. C. S.," vol. 66 (1944), page 1587, as a 200 mesh powder, was suspended in 200 cc. of acetone. Ketene was then passed into the stirred suspension while the temperature of the reaction mixture was maintained at 20° to 30°. After a total of 1.0 gram mol. of ketene had been passed into the mixture, the catalyst was filtered off, and the filtrate distilled under a vacuum. β-methyl-β-butyrolactone, boiling at 54° C. at 10 mm. pressure, was obtained in excellent yield.

*Example III.—Lactone of β-hydroxybutyric acid (β-butyrolactone)*

One gram of alumina-silica-zirconia catalyst prepared as described in U. S. Patent No. 2,347,648 or in J. A. C. S., vol. 66 (1944), page 1587, as a 200 mesh powder, was suspended in 200 cc. dry ether. The ether was maintained at 0° to 5° C., and ketene was passed in with efficient stirring at a rate of 0.5 mol per hour. At the same time, acetaldehyde was dropped into the reaction mixture at a rate of 0.4 to 0.45 mol per hour. After a total of 1.0 gram mol of aldehyde had been added, the catalyst was filtered off and the filtrate distilled at reduced pressure. A yield of 75–80% β-butyrolactone was obtained, based on the amount of ketene consumed. The product boiled 56°/10 mm.

*Example IV.—Lactone of β-acetylmethyl-β-hydroxybutyric acid*

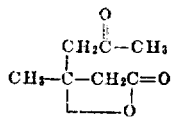

One gram of alumina-silica catalyst, prepared as described above, was added to 200 cc. of acetyl acetone. The suspension was stirred at 20–25° C. and ketene was passed in until a total of one gram/mol had been added. The catalyst was filtered off, and the reaction mixture consisted primarily of the β-lactone represented by the above formula. In order to identify the reaction mixture, it was decarboxylated by distilling under reduced pressure. A yield of 25–35% of 2-methyl-pentent-1-one-4, boiling at 127° C./735 mm., $N_D^{20}$ 1.4412 and a 10–20% yield of diisopropenyl methan, boiling at 88° C./735 mm., $N_D^{20}$ 1.4399 were obtained. The latter product was obtained due to the decarboxylation of some di-β-lactone which had formed as the result of the addition of 2 molecular equivalents of ketene to 1 molecular equivalent of acetyl acetone.

*Example V.—Lactone of β-carboethoxymethyl-β-hydroxybutyric acid*

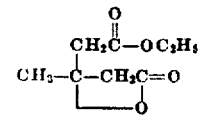

One gram of alumina-silica-zirconia catalyst, prepared as described above, was added to 150 cc. of ethyl acetoacetate and the suspension diluted with 100 cc. of ethyl ether. The suspension was maintained at 20–25° C. and ketene was passed in with efficient stirring until one gram/mol had been added. After the catalyst was filtered off, the reaction mixture consisted essentially of the lactone represented by the above formula dissolved in the ethyl ether. In order to identify the mixture it was distilled at reduced pressure. Considerable carbon dioxide was given off and a 40–50% yield of 3-methyl-3-butenoic acid ethyl ester was obtained as a result of the decarboxylation of the lactone of β-carboethoxymethyl-β-hydroxybutyric acid.

*Example VI.—Lactone of β-ethyl-β-hydroxybutyric acid*

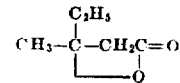

One gram of alumina-silica catalyst, prepared as described above, was added to 250 grams of methyl ethyl ketone, and ketene was passed in with stirring at 25–30° C. After 1.5 gram/mols of ketene had been added, the catalyst was filtered off, and the unreacted methyl ethyl ketone was distilled off in a vacuum to leave a residue of the lactone represented by the above formula in 70–80% yield. The product was then hydrogenated at 130–140° C. with a Raney nickel catalyst to give β-methylvaleric acid according to the equation:

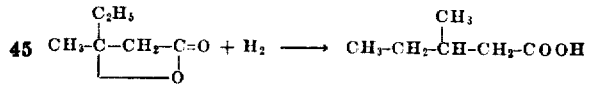

*Example VII. — Lactone of β-hydroxypropionic acid (β-propionolactone)*

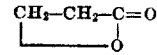

Ten (10) grams of "activated" alumina were ground to 160–200 mesh, and the ground powder suspended in 300 cc. of acetone. A gas stream comprising approximately equimolar parts of anhydrous formaldehyde and ketene was passed into the suspension through a high-speed stirrer. A considerable quantity of heat was evolved and cooling was required to maintain a temperature of 0 to 10° C. At the end of eight hours two mols each of ketene and formaldehyde had been added. A diatomaceous earth was added, and the mixture filtered. Upon distillation of the filtrate at reduced pressure, a yield of 54 grams of β-propionolactone, boiling at 51° C./10 mm., was obtained.

Other carbonyl-containing compounds can likewise be used in the process of our invention to advantage. For example, when ketene is passed into a suspension of alumina-silica-thoria catalyst in butyraldehyde, β-caprolactone having the formula:

can be obtained in excellent yield. In like manner, when ketene is passed into a stirred suspension of the oxides of aluminum, silicon, and boron in aceto-phenone, the lactone of β-phenyl-β-hydroxybutyric acid having the formula:

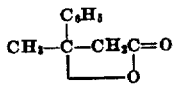

can be obtained in good yield. When furfurylaldehyde replaces the aforementioned acetophenone, the lactone of β(2-furfuryl)-β-hydroxypropionic acid having the formula:

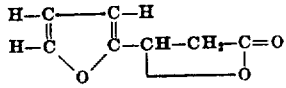

can be obtained in yields commensurate with those attained in Example I. When ketene is passed into a stirred suspension of alumina-silica catalyst in crotonaldehyde, the lactone of β-hydroxy-4-hexenoic acid can be obtained having the formula:

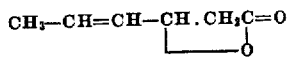

Other diketones can similarly be used by replacing the acetyl acetone of Example IV. When ketene is passed into a stirred suspension of alumina-silica-zirconia in propionyl acetone, the lactone of β-propionylmethyl-β-hydroxybutyric acid having the formula:

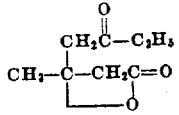

can be obtained.

If desired, instead of securing the lactone directly from the reaction mixture, it is possible to hydrolyze the β-lactone to a hydroxycarboxylic acid, and subsequently dehydrate this acid to the corresponding unsaturated acid, according to the equation:

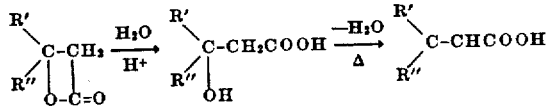

wherein R' and R'' represent hydrogen or a hydrocarbon radical. The following examples illustrate this feature of our invention.

*Example VIII.—β,β-dimethylacrylic acid*

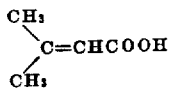

Instead of distilling the lactone of Example II under vacuum, the reaction mixture, after separation of the catalyst, was poured into 100 cc. of 15% hydrochloric acid. The mixture was then subjected to steam distillation, and after most of the water and acetone had been removed, crystals of β,β-dimethylacrylic acid began forming in the condenser. The product was obtained by ether extraction from the water solution, a yield of 50-60%, based on the original ketene consumed, being obtained. After recrystallization from water, the β,β-dimethylacrylic acid titrated to an equivalent weight of 100.0 (theoretical ==100).

*Example IX.—β-ethylcrotonic acid*

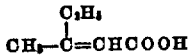

The reaction product of Example VI, after separation of the catalyst, was poured into 100 cc. of 15% hydrochloric acid, and the mixture steam distilled. After most of the water and methyl ethyl ketone had been removed, crystals of β-ethylcrotonic acid began to form in the condenser. The product was collected by extraction with ether, and after evaporation of ether, a 50-60% yield of β-ethylcrotonic acid, based on the original ketene consumed, was obtained.

The lactones of our invention are valuable intermediates in the preparation of unsaturated acids, esters, amides, and nitriles. These products are useful in preparing synthetic resins, rubbers, etc., although the β-lactones themselves can be so utilized.

We claim:

1. A process for preparing β-lactones which comprises reacting at a temperature of −20° to +60° C. a ketene having the formula:

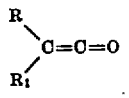

wherein R and $R_1$ each represents a member selected from the group consisting of a hydrogen atom, a methyl group, an ethyl group and a phenyl group with a carbonyl-containing compound selected from the group consisting of aldehydes having the formula:

wherein $R_2$ represents a member selected from the group consisting of a hydrogen atom, an alkyl group having the formula $C_nH_{2n+1}$ wherein $n$ is a positive integer from 1 to 4, a monocyclic aryl group of the benzene series, a benzyl group and a β-phenylethyl group; ketones having the formula:

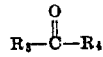

wherein $R_3$ represents a member selected from the group consisting of an alkyl group having the formula $C_nH_{2n+1}$ wherein $n$ is a positive integer from 1 to 4, a monocyclic aryl group of the benzene series, a benzyl group and a β-phenylethyl group and $R_4$ represents a member selected from the group consisting of a methyl group, an ethyl group, a monocyclic aryl group of the benzene series, a benzyl group and a β-phenylethyl group; diketones having the formula:

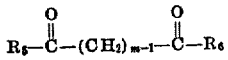

wherein $R_5$ and $R_6$ each represents a member selected from the group consisting of a methyl group, an ethyl group and a n-propyl group and $m$ represents a positive integer from 1 to 3; and ketoesters having the formula:

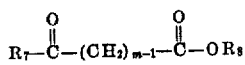

wherein $R_7$ represents a member selected from the group consisting of a methyl group and an ethyl group, $R_8$ represents an alkyl group having the formula $C_nH_{2n+1}$ wherein $n$ is a positive integer from 1 to 4 and $m$ represents a positive integer from 1 to 3 in the presence of 0.5% to 2% by weight, based on the carbonyl-containing compound used of a catalyst selected from the group consisting of alumina, and alumina-silica catalyst consisting of from 5 to 30% by weight of alumina and 70 to 95% by weight of silica, an alumina-silica-zirconia catalyst consisting of from 4 to 30% by weight of alumina, 55 to 95% by weight of silica, and 1 to 15% by weight of zirconia, an alumina-silica-thoria catalyst consisting of 4 to 30% by weight of alumina, 55 to 95% by weight of silica, and 1 to 15% by weight of thoria, and an alumina-silica-boron oxide catalyst consisting of 4 to 30% by weight of alumina, 55 to 95% by weight of silica, and 1 to 15% by weight of boron oxide, and mixtures thereof.

2. A process for preparing β-lactones which comprises reacting at a temperature of −20° to +60° C. a ketene having the formula:

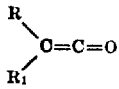

wherein R and R₁ each represents a member selected from the group consisting of a hydrogen atom, a methyl group, an ethyl group and a phenyl group with a carbonyl-containing compound selected from the group consisting of aldehydes having the formula:

wherein $R_2$ represents a member selected from the group consisting of a hydrogen atom, an alkyl group having the formula $C_nH_{2n+1}$ wherein $n$ is a positive integer from 1 to 4, a monocyclic aryl group of the benzene series, a benzyl group and a β-phenylethyl group, ketones having the formula:

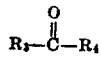

wherein $R_3$ represents a member selected from the group consisting of an alkyl group having the formula $C_nH_{2n+1}$ wherein $n$ is a positive integer from 1 to 4, a monocyclic aryl group of the benzene series, a benzyl group and a β-phenylethyl group and $R_4$ represents a member selected from the group consisting of a methyl group, an ethyl group, a monocyclic aryl group of the benzene series, a benzyl group and a β-phenylethyl group; diketones having the formula:

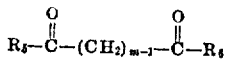

wherein $R_5$ and $R_6$ each represents a member selected from the group consisting of a methyl group, an ethyl group and a n-propyl group and $m$ represents a positive integer from 1 to 3; and ketoesters having the formula:

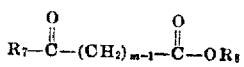

wherein $R_7$ represents a member selected from the group consisting of a methyl group and an ethyl group, $R_8$ represents an alkyl group having the formula $C_nH_{2n+1}$ wherein $n$ is a positive integer from 1 to 4 and $m$ represents a positive integer from 1 to 3 in the presence of 0.5% to 2% by weight, based on the carbonyl-containing compound used of a catalyst selected from the group consisting of alumina, and alumina-silica catalyst consisting of from 5 to 30% by weight of alumina and 70 to 95% by weight of silica, an alumina-silica-zirconia catalyst consisting of from 4 to 30% by weight of alumina, 55 to 95% by weight of silica, and 1 to 15% by weight of zirconia, an alumina-silica-thoria catalyst consisting of 4 to 30% by weight of alumina, 55 to 95% by weight of silica, and 1 to 15% by weight of thoria, and an alumina-silica-boron oxide catalyst consisting of 4 to 30% by weight of alumina, 55 to 95% by weight of silica, and 1 to 15% by weight of boron oxide, and mixtures thereof in the presence of an inert solvent.

3. A process for preparing β-lactones which comprises reacting at a temperature of −20° to +60° C. a ketene having the formula:

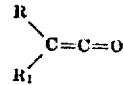

wherein R and R₁ each represents a member selected from the group consisting of a hydrogen atom, a methyl group, an ethyl group and a phenyl group with a carbonyl-containing compound selected from the group consisting of aldehydes having the formula:

wherein $R_2$ represents a member selected from the group consisting of a hydrogen atom, an alkyl group having the formula $C_nH_{2n+1}$ wherein $n$ is a positive integer from 1 to 4, a monocyclic aryl group of the benzene series, a benzyl group and a β-phenylethyl group; ketones having the formula:

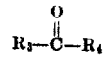

wherein $R_3$ represents a member selected from the group consisting of an alkyl group having the formula $C_nH_{2n+1}$ wherein $n$ is a positive integer from 1 to 4, a monocyclic aryl group of the benzene series, a benzyl group and a β-phenylethyl group and $R_4$ represents a member selected from the group consisting of a methyl group, an ethyl group, a monocyclic aryl group of the benzene series, a benzyl group and a β-phenylethyl group; diketones having the formula:

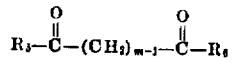

wherein $R_5$ and $R_6$ each represents a member selected from the group consisting of a methyl group, an ethyl group and a n-propyl group and $m$ represents a positive integer from 1 to 3; and ketoesters having the formula:

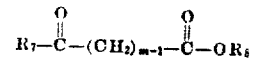

wherein $R_7$ represents a member selected from the group consisting of a methyl group and an ethyl group, $R_8$ represents an alkyl group having the formula $C_nH_{2n+1}$ wherein $n$ is a positive integer from 1 to 4 and $m$ represents a positive integer from 1 to 3 in the presence of 0.5% to 2% by weight, based on the carbonyl-containing compound used of a catalyst selected from the group consisting of alumina, and alumina-silica catalyst consisting of from 5 to 30% by weight of alumina and 70 to 95% by weight of silica, an alumina-silica-zirconia catalyst consisting of from 4 to 30% by weight of alumina, 55 to 95% by weight of silica, and 1 to 15% by weight of zirconia, an alumina-silica-thoria catalyst consisting of 4 to 30% by weight of alumina, 55 to 95% by weight of silica, and 1 to 15% by weight of thoria, and an alumina-silica-boron oxide catalyst consisting of 4 to 30% by weight of alumina, 55 to 95% by weight of silica, and 1 to 15% by weight of boron oxide, and mixtures thereof in the presence of a β-lactone corresponding to the lactone being formed.

4. A process for preparing β-lactones which comprises reacting at a temperature of −20° to +60° C. a ketene having the formula:

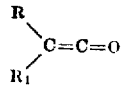

wherein R and R₁ each represents a member selected from the group consisting of a hydrogen atom, a methyl group, an ethyl group and a phenyl group with a carbonyl-containing compound selected from the group consisting of aldehydes having the formula:

wherein $R_2$ represents a member selected from the group consisting of a hydrogen atom, an alkyl group having the formula $C_nH_{2n+1}$ wherein $n$ is a positive integer from 1 to 4, a monocyclic aryl group of the benzene series, a benzyl group and a β-phenylethyl group; ketones having the formula:

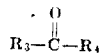

wherein $R_3$ represents a member selected from the group consisting an alkyl group having the formula $C_nH_{2n+1}$ wherein $n$ is a positive integer from 1 to 4, a monocyclic aryl group of the benzene series, a benzyl group and a β-phenylethyl group and $R_4$ represents a member selected from the group consisting of a methyl group, an ethyl group, a monocyclic aryl group of the benzene series, a benzyl group and a β-phenylethyl group; diketones having the formula:

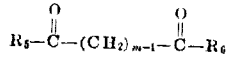

wherein $R_5$ and $R_6$ each represents a member selected from the group consisting of a methyl group, an ethyl group and a n-propyl group and $m$ represents a positive integer from 1 to 3; and ketoesters having the formula:

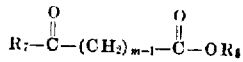

wherein $R_7$ represents a member selected from the group consisting of a methyl group and an ethyl group, $R_8$ represents an alkyl group having the formula $C_nH_{2n+1}$ wherein $n$ is a positive integer from 1 to 4 and $m$ represents a positive integer from 1 to 3 in the presence of 0.5% to 2% by weight, based on the weight of the carbonyl-containing compound, of alumina.

5. A process for preparing β-lactones which comprises reacting at a temperature of from −20° to +60° C. ketene (CH₂=C=O) with a carbonyl-containing compound selected from the group consisting of aldehydes having the formula:

wherein $R_2$ represents a member selected from the group consisting of a hydrogen atom, an alkyl group having the formula $C_nH_{2n+1}$ wherein $n$ is a positive integer from 1 to 4, a monocyclic aryl group of the benzene series, a benzyl group and a β-phenylethyl group; ketones having the formula:

wherein $R_3$ represents a member selected from the group consisting of an alkyl group having the formula $C_nH_{2n+1}$ wherein $n$ is a positive integer from 1 to 4, a monocyclic aryl group of the benzene series, a benzyl group and a β-phenylethyl group and $R_4$ represents a member selected from the group consisting of a methyl group, an ethyl group, a monocyclic aryl group of the benzene series, a benzyl group and a β-phenylethyl group; diketones having the formula:

$$R_5-\overset{O}{\underset{\|}{C}}-(CH_2)_{m-1}-\overset{O}{\underset{\|}{C}}-R_6$$

wherein $R_5$ and $R_6$ each represents a member selected from the group consisting of a methyl group, an ethyl group and a n-propyl group and $m$ represents a positive integer from 1 to 3; and ketoesters having the formula:

$$R_7-\overset{O}{\underset{\|}{C}}-(CH_2)_{m-1}-\overset{O}{\underset{\|}{C}}-OR_8$$

wherein $R_7$ represents a member selected from the group consisting of a methyl group and an ethyl group, $R_8$ represents an alkyl group having the formula $C_nH_{2n+1}$ wherein $n$ is a positive integer from 1 to 4 and $m$ represents a positive integer from 1 to 3 in the presence of 0.5% to 2% by weight, based on the carbonyl-containing compound used of a catalyst selected from the group consisting of alumina, and alumina-silica catalyst consisting of from 5 to 30% by weight of alumina and 70 to 95% by weight of silica, an alumina-silica-zirconia catalyst consisting of from 4 to 30% by weight of alumina, 55 to 95% by weight of silica, and 1 to 15% by weight of zirconia, an alumina-silica-thoria catalyst consisting of 4 to 30% by weight of alumina, 55 to 95% by weight of silica, and 1 to 15% by weight of thoria, and an alumina-silica-boron oxide catalyst consisting of 4 to 30% by weight of alumina, 55 to 95% by weight of silica, and 1 to 15% by weight of boron oxide, and mixtures thereof.

6. A process for preparing β-lactones which comprises reacting at a temperature of from −20° to +60° C. ketene (CH₂=C=O) with a carbonyl-containing compound selected from the group consisting of aldehydes having the formula:

wherein $R_2$ represents a member selected from the group consisting of a hydrogen atom, an alkyl group having the formula $C_nH_{2n+1}$ wherein $n$ is a positive integer from 1 to 4, a monocyclic aryl group of the benzene series, a benzyl group and a β-phenylethyl group; ketones having the formula:

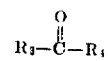

wherein $R_3$ represents a member selected from the group consisting of an alkyl group having the formula $C_nH_{2n+1}$ wherein $n$ is a positive integer from 1 to 4, a monocyclic aryl group of the benzene series, a benzyl group and a β-phenylethyl group and $R_4$ represents a member selected from the group consisting of a methyl group, an ethyl group, a monocyclic aryl group of the benzene series, a benzyl group and a β-phenylethyl group; diketones having the formula:

wherein R₅ and R₆ each represents a member selected from the group consisting of a methyl group, an ethyl group and a n-propyl group and m represents a positive integer from 1 to 3; and ketoesters having the formula:

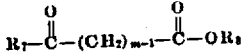

wherein R₇ represents a member selected from the group consisting of a methyl group and an ethyl group, R₈ represents an alkyl group having the formula $C_nH_{2n+1}$ wherein $n$ is a positive integer from 1 to 4, and m represents a positive integer from 1 to 3 in the presence of 0.5% to 2% by weight, based on the carbonyl-containing compound, of alumina.

7. A process for preparing a β-lactone which comprises reacting at a temperature of from −20° to +60° C. a ketene having the formula:

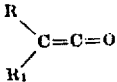

wherein R and R₁ each represents a member selected from the group consisting of a hydrogen atom, a methyl group, an ethyl group, and a phenyl group with an aldehyde having the formula:

wherein R₂ represents a member selected from the group consisting of a hydrogen atom, an alkyl group having the formula $C_nH_{2n+1}$ wherein $n$ is a positive integer from 1 to 4, a monocyclic aryl group of the benzene series, a benzyl group and a β-phenylethyl group in the presence of 0.5% to 2% by weight, based on the aldehyde used of a catalyst selected from the group consisting of alumina, an alumina-silica catalyst consisting of from 5 to 30% by weight of alumina and 70 to 95% by weight of silica, an alumina-silica-zirconia catalyst consisting of from 4 to 30% by weight of alumina, 55 to 95% by weight of silica, and 1 to 15% by weight of zirconia, an alumina-silica-thoria catalyst consisting of 4 to 30% by weight of alumina, 55 to 95% by weight of silica, and 1 to 15% by weight of thoria, and an alumina-silica-boron oxide catalyst consisting of 4 to 30% by weight of alumina, 55 to 95% by weight of silica, and 1 to 15% by weight of boron oxide, and mixtures thereof.

8. A process for preparing a β-lactone which comprises reacting at a temperature of from −20° to +60° C. a ketene having the formula:

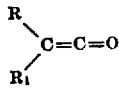

wherein R and R₁ each represents a member selected from the group consisting of a hydrogen atom, a methyl group, an ethyl group, and a phenyl group with an aldehyde having the formula:

wherein R₂ represents a member selected from the group consisting of a hydrogen atom, an alkyl group having the formula $C_nH_{2n+1}$ wherein $n$ is a positive integer from 1 to 4, a non-cyclic aryl group of the benzene series, a benzyl group, and a β-phenylethyl group in the presence of 0.5% to 2% by weight, based on the aldehyde used, of alumina.

9. A process for preparing β-lactones which comprises reacting at a temperature of from −20° to +60° C. ketene ($CH_2=C=O$) with an aldehyde having the formula:

wherein R₂ represents a member selected from the group consisting of a hydrogen atom, an alkyl group having the formula $C_nH_{2n+1}$ wherein $n$ is a positive integer from 1 to 4, a monocyclic aryl group of the benzene series, a benzyl group and a β-phenylethyl group in the presence of 0.5% to 2% by weight, based on the aldehyde used of a catalyst selected from the group consisting of alumina, an alumina-silica catalyst consisting of from 5 to 30% by weight of alumina and 70 to 95% by weight of silica, an alumina-silica-zirconia catalyst consisting of from 4 to 30% by weight of alumina, 55 to 95% by weight of silica, and 1 to 15% by weight of zirconia, an alumina-silica-thoria catalyst consisting of 4 to 30% by weight of alumina, 55 to 95% by weight of silica, and 1 to 15% by weight of thoria, and an alumina-silica-boron oxide catalyst consisting of 4 to 30% by weight of alumina, 55 to 95% by weight of silica, and 1 to 15% by weight of boron oxide, and mixtures thereof.

10. A process for preparing β-lactones which comprises reacting at a temperature of −20° to +60° C. a ketene ($CH_2=C=O$) with an aldehyde having the formula:

wherein R₂ represents a member selected from the group consisting of a hydrogen atom, an alkyl group having the formula $C_nH_{2n+1}$ wherein $n$ is a positive integer from 1 to 4, a monocyclic aryl group of the benzene series, a benzyl group, and a β-phenylethyl group, in the presence of 0.5% to 2% by weight, based on the aldehyde used, of alumina.

11. A process for preparing β-propionolactone which comprises reacting ketene ($CH_2=C=O$) with formaldehyde in the presence of 0.5 to 2% by weight, based on the formaldehyde used of a catalyst selected from the group consisting of alumina, an alumina-silica catalyst consisting of from 5 to 30% by weight of alumina, and 70 to 95% by weight of silica, an alumina-silica-zirconia catalyst consisting of from 4 to 30% by weight of alumina, 55 to 95% by weight of silica, and 1 to 15% by weight of zirconia, an alumina-silica-thoria catalyst consisting of 4 to 30% by weight of alumina, 55 to 95% by weight of silica, and 1 to 15% by weight of thoria, and an alumina-silica-boron oxide catalyst consisting of 4 to 30% by weight of alumina, 55 to 95% by weight of silica, and 1 to 15% by weight of boron oxide, and mixtures thereof at a temperature of from −20 to +60° C.

12. A process for preparing β-propionolactone which comprises reacting ketene ($CH_2=C=O$) with formaldehyde in the presence of from 0.5% to 2% by weight, based on the formaldehyde used, of a catalyst comprising 5 to 30% of alumina and 70 to 95% of silica at a temperature of —20° C. to 60° C.

13. A process for preparing β-butyrolactone which comprises reacting ketene ($CH_2=C=O$) with acetaldehyde in the presence of from 0.5% to 2% by weight, based on the acetaldehyde of a catalyst comprising 5 to 30% of alumina and 70 to 95% of silica at a tempearture of —20° C. to 60° C.

14. A process for preparing β-butyrolactone which comprises reacting at a temperature of from —20° to +60° C. ketene ($CH_2=C=O$) with acetaldehyde in the presence of 0.5% to 2% by weight, based on the carbonyl compound used of a catalyst selected from the group consisting of alumina, an alumina-silica catalyst consisting of from 5 to 30% by weight of alumina and 70 to 95% by weight of silica, an alumina-silica-zirconia catalyst consisting of from 4 to 30% by weight of alumina, 55 to 95% by weight of silica, and 1 to 15% by weight of zirconia, an alumina-silica-thoria catalyst consisting of 4 to 30% by weight of alumina, 55 to 95% by weight of silica, and 1 to 15% by weight of thoria, and an alumina-silica-boron oxide catalyst consisting of 4 to 30% by weight of alumina, 55 to 95% by weight of silica, and 1 to 15% by weight of boron oxide, and mixtures thereof.

15. A process for preparing β-propionolactone which comprises reacting ketene ($CH_2=C=O$) with formaldehyde in the presence of from 0.5% to 2% by weight, based on the formaldehyde used, of activated alumina at a temperature of —20° C. to 60° C.

16. A process for preparing β-propionolactone which comprises reacting at a temperature of —20° to +60° C. a ketene ($CH_2=C=O$) with formaldehyde in the presence of from 0.5% to 2% by weight, based on the formaldehyde used, of activated alumina and in the presence of β-propionolactone as a solvent.

JOHN R. CALDWELL.
HUGH J. HAGEMEYER, Jr.

REFERENCES CITED

The following references are of record in the file of this patent:

UNITED STATES PATENTS

| Number | Name | Date |
|---|---|---|
| 2,382,464 | Boese | Aug. 14, 1945 |
| 2,424,590 | Steadman et al. | July 29, 1947 |